Sept. 17, 1963 A. W. HOLT 3,104,371

CHARACTER INFORMATION POSITIONING IN READING MACHINE

Filed Feb. 2, 1961

INVENTOR
ARTHUR W. HOLT

BY Joseph A. Genovese
Max L. Libman

ATTORNEYS

United States Patent Office 3,104,371

Patented Sept. 17, 1963

3,104,371

CHARACTER INFORMATION POSITIONING IN READING MACHINE

Arthur W. Holt, Silver Spring, Md., assignor to Rabinow Engineering Co., Inc., Takoma Park, Md.

Filed Feb. 2, 1961, Ser. No. 86,778
7 Claims. (Cl. 340—146.3)

This invention relates to reading machines, and particularly to techniques for shifting character-identification data in the memory of a reader to a predetermined position, thereby materially facilitating readout of the data from the memory.

The present application is a continuation-in-part of copending application Serial No. 32,911 assigned to the same assignee as this application. Pertinent parts of the copending application discuss the desirability of knowing where the character data is located in the temporary storage of the reading machine at the instant of readout. These parts are repeated in this specification later. Therefore, it is sufficient to note here that it is important to know the location in the memory of the data corresponding to an unknown character in the process of being recognized by the machine.

The M. H. Glauberman Patent No. 2,932,006 describes a reading system where the data is shifted serially in a magnetic core shift register in order to keep track of the position of the data. Shifting takes place during the scanning of the unknown character. Also, shifting is a function of scan information, because the register is advanced when there is no scan-to-scan identity.

Although Glauberman and I shift data in the reading machine memory and know the location of the data at the instant of readout, my invention achieves the objective by means and procedures that are not similar to Glauberman. I shift the registers in parallel instead of serially, and independently of the nature and content of scan information.

Data shifting, according to my invention, is accomplished in several ways. One is to shift the data in the memory until at least one bit reaches an edge of the shift register matrix. Another is to assume an imaginary dividing line in the memory and examine the divided portions of the memory for information content. Then the data is shifted in either direction with respect to the line to equalize the data on both sides of the line. This technique is referred to as "center of black" in the copending application. "Center of gravity" positioning, also described therein, is similar except that the weight is given to the distances between the imaginary line and the bits of information in the memory.

An object of the invention is to provide means to shift (when necessary) to the data in a reading machine memory to a predetermined position thereby simplifying the means for interrogating the memory and transferring the data to another part, usually the decision section, of the reading machine.

Another object of the invention is to provide new shifting techniques for the character data temporarily stored in a reading machine during the character identification process.

A further object of the invention is to provide a data shifting system for the memory of a reading machine, wherein the data is shifted in parallel and to a predetermined position related to an imaginary line in the memory regardless of the assumed position of the line, thereby locating the data in a predetermined known position to facilitate readout of the data.

Another object is to provide means for shifting the data in the temporary memory of a reading machine, wherein the shifting means minimize the difficulties encountered when noise and spurious data is unintentionally stored in the memory.

Other objects and features will become evident in following the illustrated forms of the invention.

Figures 1, 2, 3, 3A, 3B, 4:
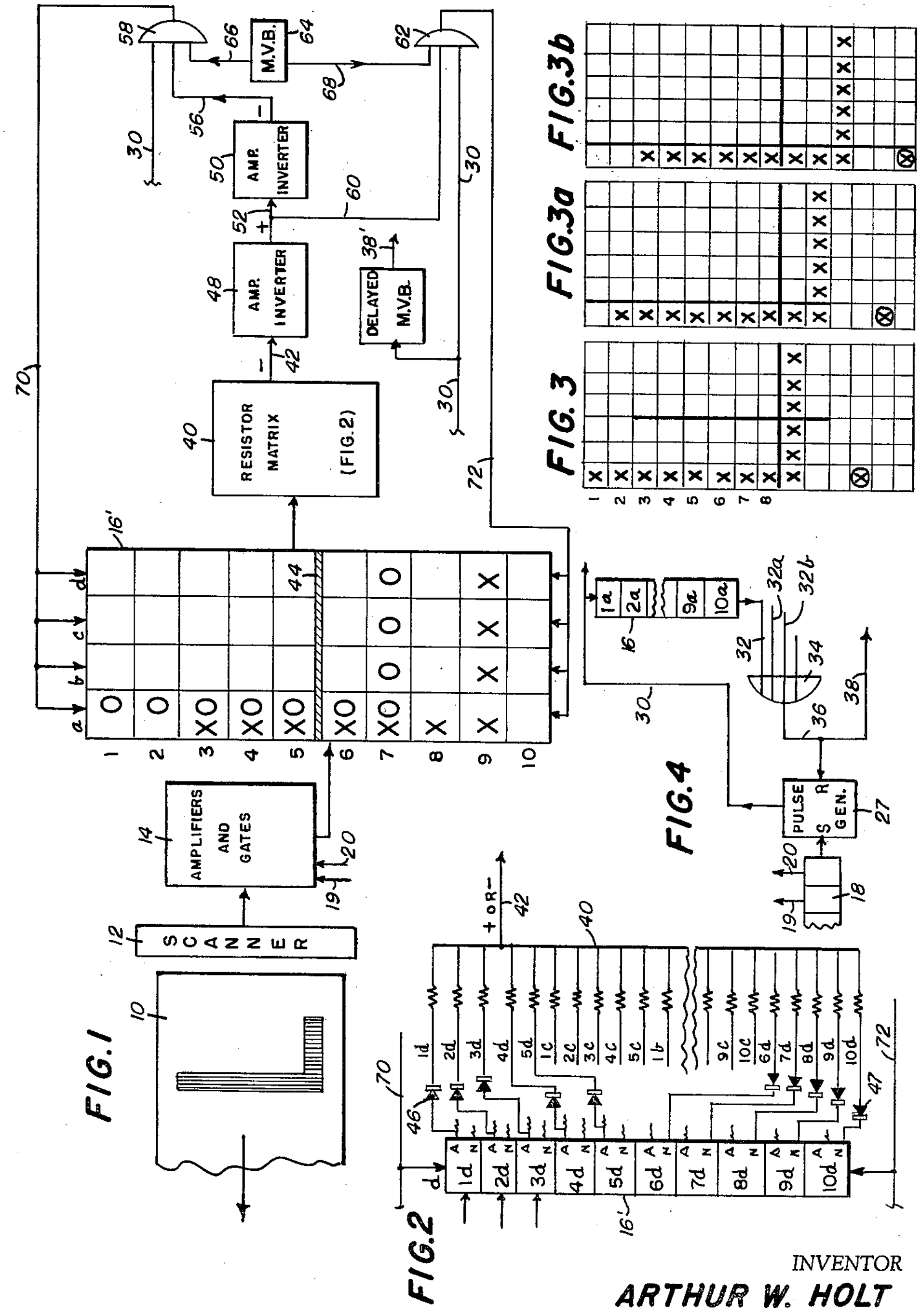
FIGURE 1 is a diagrammatic view showing one system for practicing the invention.
FIGURE 2 is a fragmentary view showing details of a portion of the system in FIGURE 1.

FIGURES 3–3*b* are schematic views showing methods of positioning characters.

FIGURE 4 is a fragmentary view showing particularly a portion of the means to shift the storage register down until the lowermost stage receives a part of the data in the register.

A part of FIGURE 1 and FIGURE 4 are essentially reproduced from the copending application disclosing a character reading machine. A brief summary of the pertinent parts of that machine is given below to facilitate understanding of the invention claimed herein.

FIGURE 1 shows an area 10 containing the character "L" moving horizontally in the view of scanner 12. The scanner is composed of a row of photocells whose outputs are amplified and gated at 14 into a temporary storage or memory 16 (FIGURE 2). Scan timing is obtained by a shift register timing generator 18 providing pulses on successive lines 19, 20, etc., that are used as gate inputs at 14. In this way scan information is gated into memory 16, consisting of a plurality of columns (one shown in FIGURE 2) of shift registers whose stages are made of flip flops. Each flip flop has two outputs which switch levels, e.g. +6 and −6 volts, depending whether its scanner photocell "sees" a part of the character "L," or fails to see a part of the character respectively. The flip flop outputs are termed "assertions" and "negations." These terms, and a complete description of the machine summarized above are found in the copending application.

After the complete character on area 10 is gated into the memory it is shifted down until the lowest stage of any memory column, for instance the "*a*" column is set. To do this (FIGURE 4), pulse generator 27 is actuated after the last scan is established by an output on line 20 of timing generator 18. The output of pulse generator 27 on wire 30 provides shift pulses simultaneously to all stages of the shift register memory 16 until the lowest stage (10*a* as shown in FIGURE 4) is set, meaning that a part of the character data has reached the bottom of the memory. When this happens, line 32 changes voltage level. This line, plus one other line 32*a*, 32*b*, etc., for each memory column, is OR gated at 34 to provide an output on line 36. An output on line 36 disables pulse generator 27 causing the shift pulses on line 30 to discontinue. Line 38, connected to line 36, provides a "read" signal for the machine to initiate a sequence of functions which are not pertinent to my present invention, except that the "read" signal does not occur until the data is shifted to a known position in the memory.

The pending application discusses several problems and alternate shift procedures with which my present invention is concerned. These are quoted (with minor changes) from the application, and FIGURES 3, 3*a* and 3*b* are copied from the same application.

"Often in reading characters the printing will be so bad that a bottom dot may be left off a character or an extra dot at the bottom of a character can be picked up. Also, despite careful design of optical apertures (of the scanner), dirt and wayward ink spots get picked up and put into the storage registers at extraneous positions. The 'shift-down' method of normalizing the vertical position of a character (see FIGURE 4) has the disadvantage that it is quite sensitive to such pick-up. This is illustrated in FIGURES 3–3*b* which illustrate alternate methods of positioning the characters. At the left of FIGURE 3 we have shown the character L as it might have come into a set of storage registers before shifting down. The black points are designated by X's. Underneath the L we have shown a single black point which is circled. Let us assume that this was a piece of dirt which was picked up. If the simple shift-down technique is used (see FIGURES 2 and 4) then the equipment will stop shifting down as soon as this circled black hits the bottom of one of the registers. This will obviously throw off the vertical positioning of the character three units from its correct position. To illustrate the general nature of this principle, it will be discussed for the case of a 6×9 matrix although any matrix dimension may be used in practice.

"An alternate method of positioning characters to match their pre-constructed resistor matrices is to use the method which we call 'center of black.' To accomplish center of black positioning, we merely draw an arbitrary horizontal line and shift the character down (or up) until there are as many black points above this line as there are below this line. Thus, the illustration of L (FIGURE 3*a*) we have shown seven black points above the line and 7 black points below the line, neglecting the circled black. In this particular example it can be seen that the final position of the character can be thrown off only one vertical unit by the presence of a single black point. If we count the circled X, then there are eight below the line and seven above the line. If the equipment had chosen to shift the character up one unit then there would be eight above and seven below. In any case, the positioning is off only one unit and not by three units.

"Another type of positioning is the 'center of gravity' positioning. In this technique we weigh each black point by the distance it is from the arbitrary horizontal line—the L has, therefore, twenty-one units above the horizontal line and twenty-one units below the horizontal line, neglecting the circled black. If the black is included, however, we have six extra units below the line. In this case the equipment would be tempted to move the whole character up one notch. It can be seen that a single black undesired point can affect the positioning of the characters more undesirably using the center of gravity positioning than using the center of black positioning.

"It can be seen that this same technique can be used to position the characters on a left-right basis as well as on an up-down basis. In general, however, the horizontal positioning is taken care of by the start of characters, and is normally very close to a known point anyway.

"One of the important uses for the center of black positioning method will occur when it is desired to read characters from many different sources in the same machine. In such machines it is necessary to use a very much larger number of storage stages in order to resolve the detail of some of the small characters, particularly the lower case characters of a twelve-pitch typewriter font. With such high resolution, the outlines of the characters become quite blurry, and it is advantageous to use a center of black positioning instead of trying to shift down to a non-flat outline point. We can also practically ignore small differences in font such as the exact positions of the serifs."

Attention is directed to FIGURES 1 and 2 showing one way to examine and shift the registers of memory 16′ by the "center of black" procedure. It will be seen later that the "center of gravity" procedure is accomplished in the same way, the only difference being the selection of resistor values in matrix 40.

Memory 16′ may be identical to memory 16, and I have reproduced the "*d*" column shift register at the left of FIGURE 2. Resistor matrix 40 is composed of a resistor (or an equivalent) for each flip-flop of memory 16′, and all of the resistors are connected in parallel with a single output line 42. The imaginary line 44 is established by connecting the assertion wires (A in FIGURE 2) of flip-flops 1*d*–5*d* inclusive to a portion of the resistors of matrix 40, through unidirectional devices, e.g., diodes 46. The negation wires (N) of the remaining flip-flops 6*d*–10*d* inclusive are connected to other resistors of martix 40 through blocking diodes 47 which are reversed relative to diodes 46. The imaginary line 44 can be located in any position or direction by selection of flip-flops of memory 16′, and dividing the resistor matrix correspondingly.

Matrix 40 connected as described above, has the effect of examining the memory for data content on opposite sides of the line 44, and providing an output signal on line 42 whose polarity and value will indicate the unbalance (if any) of data with respect to the line. The signal on line 42 (FIGURE 1) is fed to a transistor amplifier inverter 48. Its output is fed on 52 to a second amplifier inverter 50. The output line 56 of inverter 50 is one input of a three-input AND gate 58. The line 60 connected to inverter output line 52, forms an input of three-input AND gate 62. A pulse generator, e.g. multivibrator 64, has output lines 66 and 68 as inputs to gates 58 and 62. The final input of gates 58 and 62 is a trigger line which becomes energized when the unknown character (L) has been completely scanned. The trigger line may be the same as line 30 (FIGURE 4), and for the purpose of showing the principles of my invention, it is so identified. The outputs of gates 58 and 62 on lines 70 and 72 respectively, provide shift pulses for the shift register columns *a–d*.

In operation, assume that the signal on line 42 is negative which would be the case when the scan data in memory 16′ appears as shown by the X's. The amplified inverted signal on line 52 is positive and applied over line 60 to gate 62. The second inversion of the signal on line 56 would then be negative, and applied to gate 58. When the end of scan occurs, lines 30 conduct a positive signal to both gates 58 and 62. It is assumed that the multivibrator 64 is free running. Under these conditions only gate 62 will be satisfied because line 60 is positive, and line 56 to gate 58 is negative. As a condition for the gates to operate, all inputs must be positive. Thus, pulses (corresponding to the multivibrator pulses) will occur on line 72, shifting the data in memory 16′ upward. When the data reaches the position marked with zeros in the memory, there is as much data above line 44 as below it. Hence, the output on line 42 will be zero, or approximately zero. Since the input to amplifier inverters 48 and 50 is now essentially (or actually) zero, no signals will appear on gate input lines 56 or 60. Thus, neither gate 62 nor gate 58 is satisfied, and the shift pulses on line 72 discontinue. Obviously, if the signal on line 42 were originally positive instead of negative, the operation would be the same, except that gate 58 instead of 62 would be satisfied (providing "down" shift pulses on line 70).

The next function of the reading machine (readout of the memory) may now begin because the data in the memory has been shifted to a known position. In those cases where the data is shifted to the bottom (or top) edge of the memory, the "read" signal on line 38 may be used (FIGURE 4). In other cases, e.g. FIGURE 2, the "read" signal may be developed in a slightly different way. One is to use a delayed multivibrator 76 or the equivalent as a pulse generator. A signal on line 30 (signaling the end-of-scan timing) is used to actuate multivibrator 76. Its output on line 38′ corresponds to the signal on line 38 (FIGURE 4). Alternatively, multivibrator 76 may be gated off by signals on line 42 and 52 or both, with a signal on line 30. Thus, as long as there is an output, within small tolerance, on lines 42 and/or 52 from resistor matrix 40 (signifying an unbalance of data on the sides of line 44), multivibrator 76 will be inhibited. When the signal on line 42 approaches zero, multivibrator 76 will be actuated to ultimately provide a "read now" signal.

The "center of gravity" technique may be practiced by the same circuits described above. However, additional weight is assigned to each bit in the memory, proportional to its distance from line 44. The simplest way of achieving this is by selection of values of the resistors in matrix 40, corresponding to the distances.

The preceding description is given by way of example only. There are many variations which may be made. For instance, instead of a single matrix 40, I may use two submatrices and a comparator for the outputs thereof. Although the analog solution proposed is probably the most economical, many solutions using digital counting techniques are also possible and practical. For example, the number of bits of information in memory 16′ may be digitally counted above and below the line 44, instead of converting the same information into analog voltages by matrix 40. Accordingly all variations within the scope of the following claims may be resorted to.

I claim:

1. In a character reading machine provided with a scanner, a memory, means responsive to scanner outputs for loading said memory with information corresponding to the character being scanned, means to examine portions of the memory on opposite sides of an artificial reference line and to develop a signal indicating unbalance of information on either side of the line, and means responsive to said information unbalance signal for shifting the information in said memory in either one of two directions with respect to said line to locate the information in a predetermined position in the memory with approximately equal portions of the information on each side of said reference line, thereby facilitating readout of the memory and ultimate identification of the character.

2. In a character reading machine having a scanner for an unknown character on an area, a memory, means responsive to scanner outputs to store information regarding the unknown character in the memory in preparation of interrogating the memory for information content; means to shift the information in said memory to a predetermined position when scanning is complete, said shift means including means to examine portions of said memory on both sides of a reference for information content regarding the unknown character, means to develop a signal corresponding to the quantity of information in said portions of the memory, and means responsive to said developed signal for providing and applying a shift signal to said memory to shift the information in said memory in either one of two directions in response to and as required by said developed signal to substantially equalize the information on both sides of said reference between said portions of said memory and thereby substantially equally distribute the stored information on both sides of said reference.

3. The machine of claim 2 wherein said memory includes a plurality of shift registers composed of bistable devices, and said means to examine portions of said memory comprise a matrix having a part fed by outputs of some of said bistable devices, and a second part fed by outputs of others of said bistable devices.

4. The machine of claim 2 wherein said memory includes a plurality of columns of digital devices, and said shift signal being applied to said columns in parallel so that the information therein is shifted in parallel.

5. In a reading machine provided with a scanner and a memory for temporary storage of information corresponding to outputs of the scanner, the improvement comprising means to examine said memory for the position of the information thereof and produce a signal corresponding to said position, and means responsive to said signal to move said stored information in either one of two directions in said memory, and the effective direction of said two directions being responsive to the quantity of stored information on either side of an imaginary reference line in said memory.

6. In a reading machine provided with a scanner and a memory for temporary storage of information corresponding to outputs of the scanner, the improvement comprising means effectively dividing said memory into two parts on two sides of an imaginary line and including means to examine each part of said memory for stored information, means responsive to said examining means to provide a stored-information location signal indicating that the information is stored in a position either to one side or the other side of said line, and means responsive to said location signal for moving said stored information in either one of the two directions corresponding to said location signal in order to position said stored information in said register partially on each side of said line.

7. In a character reading machine provided with a scanner to examine the characters, a register of memory elements capable of storing and shifting information pertaining to an unknown character examined by said scanner, the improvement comprising means to establish a reference position for the information stored in said register and to examine said memory elements and provide a first or a second distinguishable signal indicating that the stored information is at least in a major part on one side or the other of said reference position, means to shift the stored information in either of one of two directions in said register with respect to said reference position, the last-mentioned means including shift signal providing means, first combining means for said first distinguishable signal and said shift signal, second combining means for said second distinguishable signal and said shift signal, said combining means which is satisfied by its distinguishable signal being operative to provide a register-shifting signal to shift the stored information in a predetermined direction with respect to said reference position, means connected with said register and said first combining means to conduct said register-shifting signal to said register, conductive means connected with the other combining means and said register to make register-shifting signals available to the register when said second combining means are effective, and decision means operatively connected with said register to identify the unknown character of the basis of the information stored in said register.

No references cited